June 22, 1965    W. DU BROFF    3,190,052
CARTON HANDLING APPARATUS
Filed Oct. 19, 1962    4 Sheets-Sheet 4
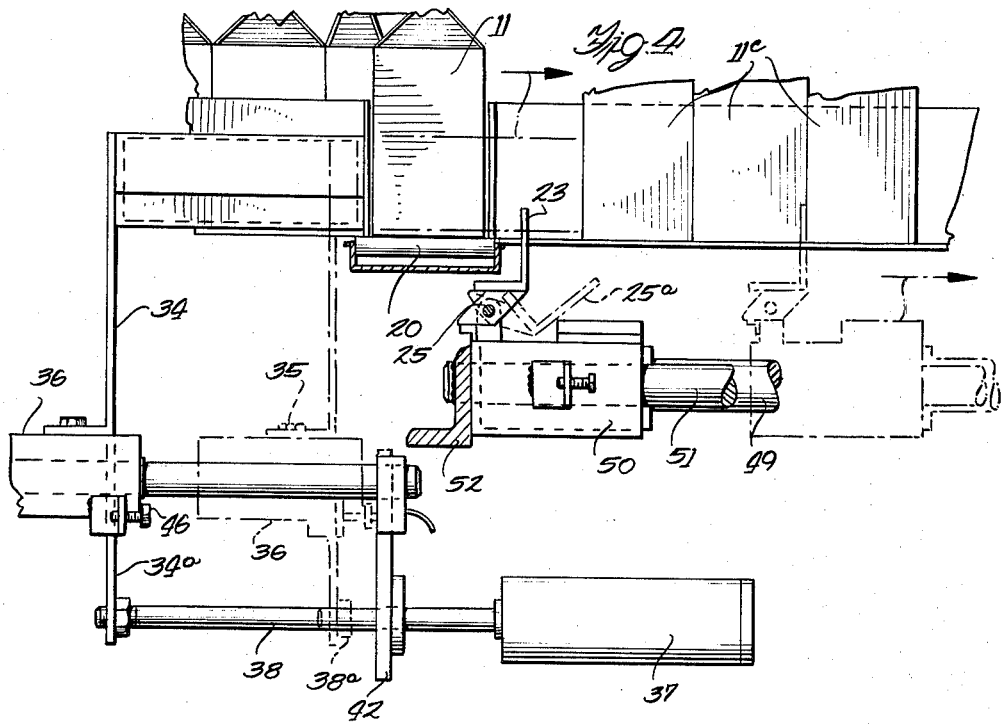
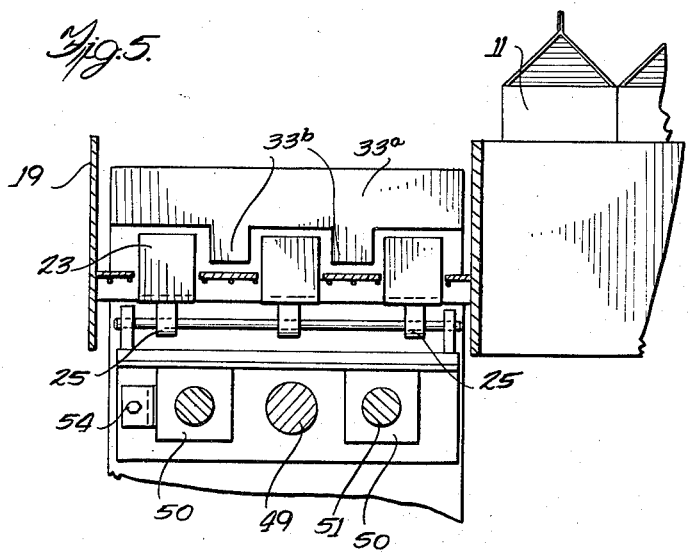
Inventor
Warren Du Broff
Dawson, Tilton, Fallon
Lungmus & Alexander
Attorneys

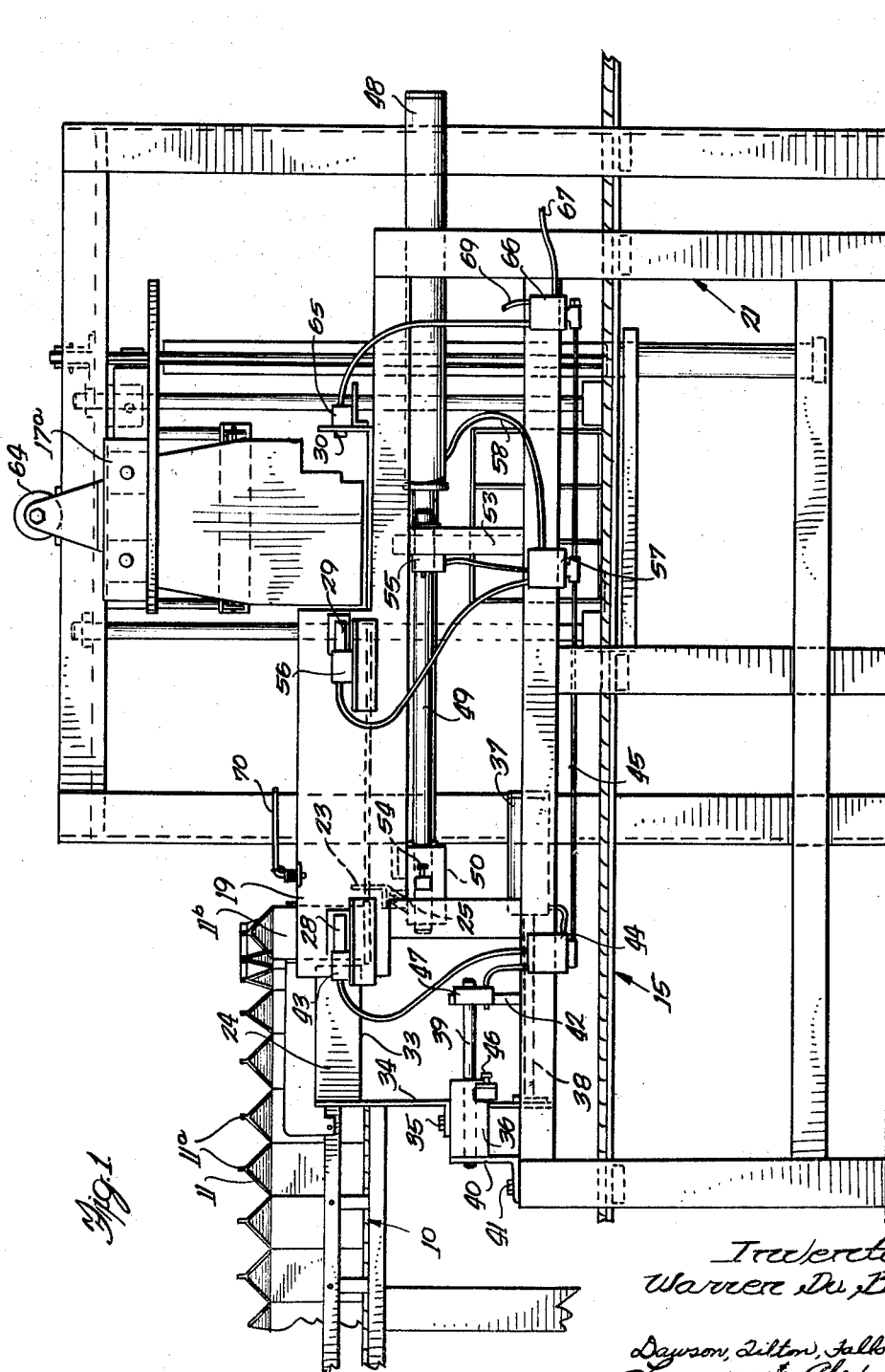

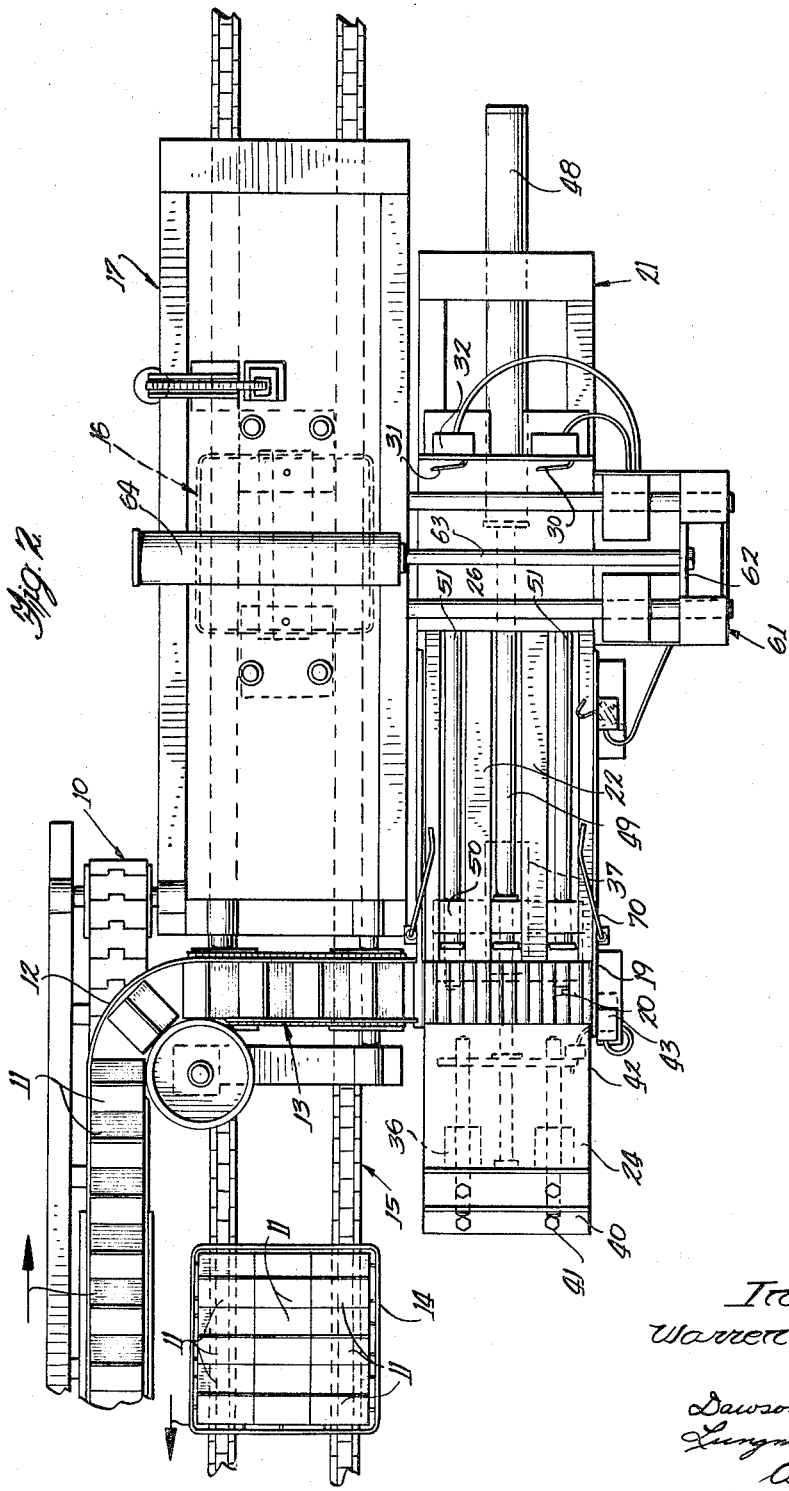

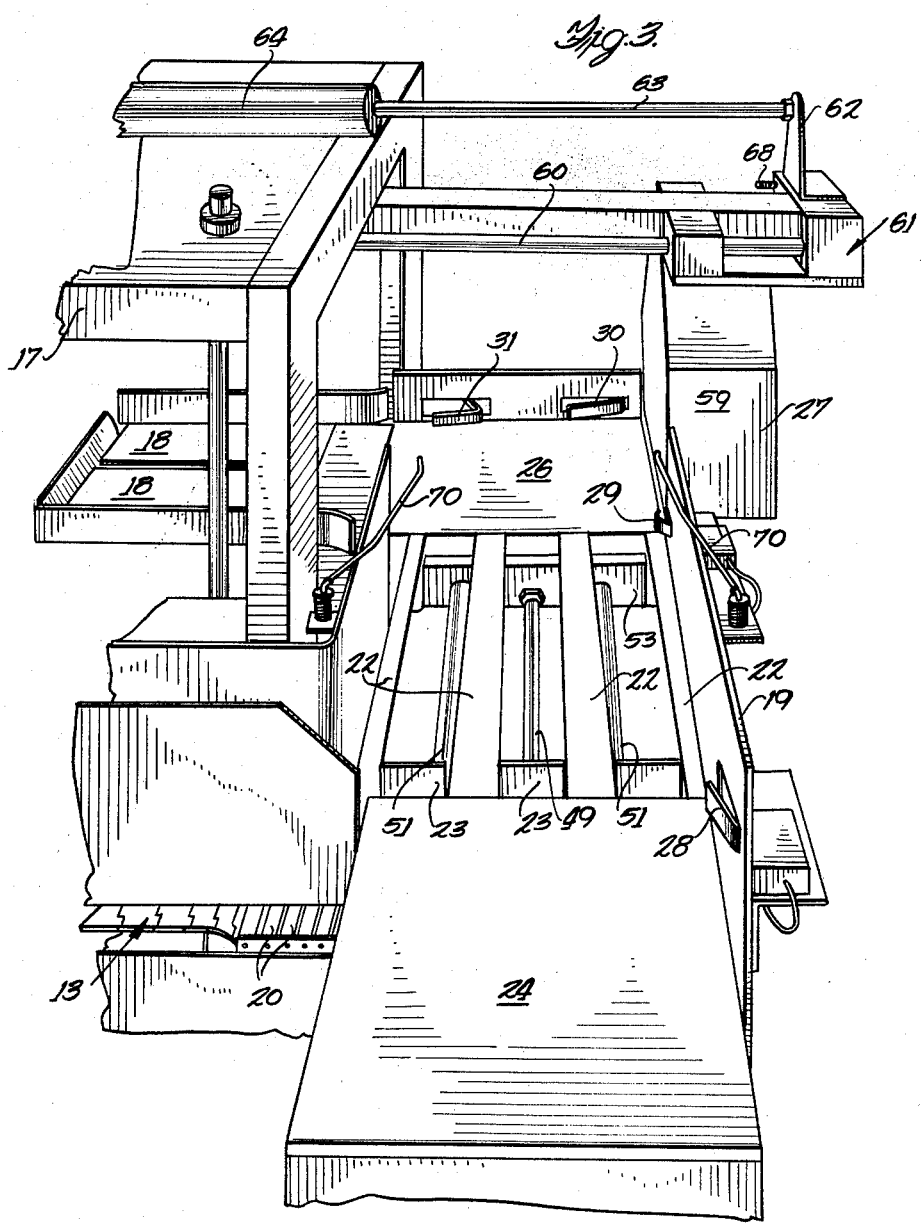

United States Patent Office 3,190,052
Patented June 22, 1965

3,190,052
CARTON HANDLING APPARATUS
Warren Du Broff, 350 Carol Court, Highland Park, Ill.
Filed Oct. 19, 1962, Ser. No. 231,805
3 Claims. (Cl. 53—62)

This invention relates to carton handling apparatus, and, more particularly, to apparatus for grouping cartons from a conveyor and presenting them to casing appartus.

The invention finds particular utility in connection with the casing apparatus disclosed in the copending application of Warren Du Broff, Serial No. 30,797, filed May 23, 1960, now Patent No. 3,047,990.

That application has to do with a mechanism for gripping the upstanding ribs of paperboard milk cartons, and the like, so as to deposit a plurality of such cartons in a wire basket, i.e., a case.

In the milk bottling industry where such cartons are widely used, the problem has been to synchronize the output of the conveyor from the filling machine with the caser. Heretofore, it has been necessary to interrupt the operation of either the conveyor and/or the caser when cartons are being processed at the desirable economic rate of 100 per minute. This necessarily led to complexity in the regulatory devices and the utilization of space for accumulating cartons for further handling. Aside and apart from the economics involved in the space occupied, it is manifestly undesirable to extend the resident time of milk cartons between filling and subsequent storage under refrigeration—as in long conveyor lines, accumulators, etc.

The instant invention solves this problem and does so with compact apparatus, and the provision of such a mechanism constitutes an important object of this invention.

Other objects and advantages of the invention may be seen in the details of construction and operation set down in this specification.

The invention will be described in conjunction with the accompanying drawing, in which an illsutrative embodiment is depicted, as follows:

FIG. 1 is a fragmentary elevational view of the inventive mechanism and which illustrates the in-feed conveyor;

FIG. 2 is a fragmentary top plan view of the apparatus of FIG. 1 and which also depicts the filled case conveyor in fragmentary form, along with the casing apparatus of the above-mentioned application in outline form;

FIG. 3 is a fragmentary perspective view of the apparatus of FIGS. 1 and 2 as would be seen looking from the carton in-feed conveyor toward the casing apparatus;

FIG. 4 is an enlarged fragmentary elevational view, partially in section, of certain transfer mechanisms also seen in elevation in FIG. 1; and FIG. 5 is a sectional view of the transfer mechanisms of FIG. 4 but taken at a right angle thereto.

In the illustration given and with particular reference to FIG. 2, the numeral 10 designates generally an in-feed conveyor for cartons 11. The cartons 11 can be seen in elevational form in FIG. 1 and are seen to include the characteristics upstanding ribs 11a which are well known in this art. These cartons 11 are fed sequentially around a right-angled turn 12 onto another in-feed conveyor generally designated 13 (designated only in FIG. 2). Ultimately, as seen still in FIG. 2, the cartons 11 are positioned in an arrangement of nine (3 by 3) in a case 14 which is transported to a refrigerated locker, truck, etc. by means of an out-feed conveyor generally designated 15. The actual casing of the cartons is achieved by a caser structure generally designated 16, the details of which can be found in the above-mentioned application. For the purpose of this disclosure, the caser includes a frame 17 (see FIG. 3) and trap doors 18 which initially support the arrangement of nine cartons prior to gripping by the head 17a (FIG. 1) and thereafter guides them into the case 14. The instant invention is concerned with handling of the cartons from the time they reach an abutment 19 (see FIGS. 1–3 and 5) until they are positioned on the trap doors 18.

As the cartons 11 issue from the conveyor 13, they are forced onto idler rollers 20 (see FIGS. 2, 3 and 4). The rollers 20 are rotatably mounted on a frame generally designated 21 which is integrated with the caser frame 17 and fixed with respect to the conveyors 10, 13 and 15. Rigidly mounted on the frame immediately adjacent the rollers 20 are horizontal platform-providing elements 22. The elements 22 are horizontally spaced apart to provide slots or openings for the reciprocation of pusher dogs 23. Cartons on the rollers 20 are moved onto the platform elements 22 under the urging of a pusher or ram 24 which is reciprocably mounted on the frame 21. For example, and in connection with the illustration given, a group of three cartons is accumulated on the rollers 20. At this juncture, the pusher 24 moves to the right in FIG. 2 to force the cartons in the position designated 11b in FIG. 1 onto the platform-providing elements 22—and, in so doing, temporarily depresses the pusher dogs 23 which are pivotally mounted as at 25 (see FIGS. 1, 4 and 5) to the dotted line position designated 25a in FIG. 4. The dogs 23 are spring-loaded to effect a return to the solid line position designated 23 in FIG. 4.

After nine cartons have been accumulated as at 11c in FIG. 4, the pusher dogs constituting a second pushing or ram element move the plural group arrangement of cartons onto a solid, uninterrupted platform 26 (see FIGS. 2 and 3). Thereupon a third pushing or ram element 27 moves at right angles to the direction of movement of rams 23 and 24 to move the nine-carton arrangement onto the trap doors 18.

The sequence of operations is controlled by a number of air-operated switches. For example, the initial group of three cartons, when assembled on the rollers 20, engage a switch arm 28 (see FIG. 3), which controls the operation of the first pusher 24. In the illustration given, when the pusher 24 has accumulated an arrangement of nine cartons by three sequential reciprocations, the leading right-hand carton engages a switch arm 29 (again see FIG. 3) which actuates the pusher dogs 23.

The movement of the pusher dogs 23 results in placing the arrangement of nine cartons on the platform 26, where the leading cartons engage a switch arm 30 (still see FIG. 3) which operates the third pusher 27.

A fourth switch arm 31 is provided on the same portion of the frame supporting switch arm 30 and which serves to prevent jams. The switch 32 (see FIG. 2) operated by the switch arm 31 has a time-delay element (not shown) which senses too long a delay in moving cartons off the platform 26 onto the trap doors 18 and when this delay time is realized, the switch 32 operates to shut down all three of the pushers 23, 24 and 27.

The first pusher 24 includes a box-like metal structure 33 secured to an upstanding arm 34. In turn, the arm 34 is bolted as at 35 to a pair of cross blocks 36. The pushing face 33a (see FIG. 5) of the box-like pusher element 33 is equipped with depending portions 33b which pass between the upstanding dogs 23 during the first transfer movement. This movement is achieved through the operation of an air cylinder 37 (see FIG. 4) which is suitably anchored to the frame 21 and which is equipped with a piston rod 38 connected by means of a cross bar 39 to the depending portion 34a of the arm or back plate 34. The blocks 36 are slidably mounted on rods 39, which are supported by means of an angle 40 bolted to the frame as at 41 and by another bracket or pedestal as at 42.

First pusher operation

As a carton in the position 11b of FIG. 1 engages the switch arm 28, air is vented through a poppet valve 43 which shifts the position of the valve element within the positioning valve 44 so as to deliver air from line 45 to the air cylinder 37 and cause the same to retract its piston rod 38 to the dotted line position designated 38a in FIG. 4. At this juncture, the block 36, which carries a bolt actuator 46, causes the actuator to engage a poppet valve 47 to change the condition of the positioning valve 44 and thereby causes the piston rod 38 to return to the solid line position of FIG. 4.

During reciprocation of the first pusher 24, the box-like nature of the element 33 retards additional cartons 11 from proceeding onto the rollers 20. Also the box-like element 33 is suitably offset from the end wall 19 carrying the switch arm 28 so that the switch arm 28 is ready for a signal from subsequent cartons in the position designated 11b. Suitable positioning valves for installation as at 44 can be the 400 series marketed by Mead Specialties Company, Inc., of Chicago, Illinois.

Second pusher and operation

The second pusher which makes use of the dogs 23 moves the cartons 11 in the same direction as the first pusher 24. For this purpose, the frame is equipped with another air cylinder 48 having a piston rod 49. The piston rod 49 is coupled to a cross block 50 which pivotally supports the dogs 23. The cross block 50 is slidably supported on rods 51, which in turn are carried by a supporting angle 52 at one end and a beam member 53 at the other. As before, the cross block 50 is equipped with a forwardly-projecting bolt actuator 54 which is engageable with the poppet valve 55 so as to limit the retraction of the piston rod 49. The retraction of the piston rod 49 is initiated upon a signal delivered from the switch arm 29 which actuates the poppet valve 56 so as to vent one side of the positioning valve 57. The other side of the positioning valve 57 is vented by the poppet 55, with the positioning valve 57 delivering or exhausting, as the case may be, air from the cylinder 48 by means of a line 58.

Third pusher and operation

The third pusher 27, like the first pusher 24, constitutes a box-like structure 59 slidably mounted on rods 60 (see FIG. 3). The superstructure of box 59, designated generally by the numeral 61, is coupled as at 62 to the piston rod 63 of an air cylinder 64 mounted on the caser frame 17. The operation of the pusher 27 is analogous to that of the pushers 23 and 24 in that the switch arm 30 actuates a poppet 65 to control the position of the positioning valve 66. Through line 67, the air cylinder 64 is actuated with the limit of its operation being determined by another poppet valve (not shown) actuated through bolt actuator 68 so as to deliver a signal through line 69 to the positioning valve 66.

Also cooperating with the dog pushers 23 in the movement of the cartons along the platform elements 22 are spring-loaded guide bars 70 (see FIG. 3), which tend to keep the carton arrangement consolidated. Through the inventive structure, it is possible to materially speed up the casing of cartons being fed to a caser along a single in-feed conveyor as at 13. For example, the pusher 24 can be operating to establish a second arrangement while the dog pushers 23 are in the reciprocation stage for transporting an arrangement onto the platform 26. This eliminates a substantial drawback of prior art machines where it was necessary to stop all consolidating equipment while the case pusher 27 was in operation.

While, in the foregoing specification, a detailed description of an embodiment of the invention has been set down for the purpose of illustration thereof, many variations in the details herein given may be made by those skilled in the art without departing from the spirit and scope of the invention.

I claim:

1. In carton handling apparatus, a horizontally disposed carton conveyor, a frame beneath said conveyor, an abutment on said frame for halting cartons being advanced by said conveyor, a ram on said frame adapted for horizontal reciprocal movement to shift a group of cartons halted by said abutment and a switch on said abutment engageable by a halted leading carton for actuating said ram, said ram being equipped with a generally vertical side in confronting relation with cartons subsequently advanced by said conveyor, a slotted platform on said frame positioned to receive cartons shifted by said ram, a plurality of rockably mounted dogs mounted on said frame for horizontal reciprocal movement to shift the pattern of groups of cartons initially shifted in single groups by said ram, a switch adjacent said platform engageable by said leading carton when part of an assembled pattern for actuating said dogs, a receiving platform on said frame positioned to receive a pattern of carton groups shifted by said dogs, a caser ram mounted on said frame for reciprocal horizontal movement in a direction perpendicular to the direction of movement of the first-mentioned ram and said dogs and a switch on said frame engageable by said leading carton for actuating said caser ram, a caser positioned in the path of a carton pattern being shifted by said caser ram, and a horizontally disposed conveyor positioned below said caser for conducting cased cartons away from said caser.

2. The structure of claim 1 in which additional switch means are provided for sensing a carton jam during the operation of said caser ram.

3. The structure of claim 1 in which said carton conveyor is equipped with idler rollers aligned with said slotted platform, the first-mentioned ram being operative to move over said rollers for transferring said cartons onto said platform.

References Cited by the Examiner

UNITED STATES PATENTS

| | | | |
|---|---|---|---|
| 1,437,410 | 12/22 | Evans et al. | 53—166 |
| 2,109,294 | 2/28 | Kimball et al. | 53—59 |
| 2,649,231 | 8/53 | Ferguson et al. | 53—60 |
| 2,679,963 | 6/54 | Neal | 53—62 |
| 2,747,353 | 5/56 | Shibata | 53—249 |

FRANK E. BAILEY, *Primary Examiner.*

TRAVIS S. McGEHEE, *Examiner.*